(12) United States Patent
Bansal et al.

(10) Patent No.: US 8,388,885 B2
(45) Date of Patent: Mar. 5, 2013

(54) MEMBRANE STRUCTURE FOR VACUUM ASSISTED MOLDING FIBER REINFORCED ARTICLE

(75) Inventors: Vishal Bansal, Overland Park, KS (US); Nusrat Farzana, Lee's Summit, MO (US)

(73) Assignee: General Electric Company, Schenectady, NY (US)

( * ) Notice: Subject to any disclaimer, the term of this patent is extended or adjusted under 35 U.S.C. 154(b) by 873 days.

(21) Appl. No.: 12/272,883

(22) Filed: Nov. 18, 2008

(65) Prior Publication Data

US 2010/0285297 A1 Nov. 11, 2010

(51) Int. Cl.
*B29C 51/10* (2006.01)
(52) U.S. Cl. ........................ 264/511; 264/571
(58) Field of Classification Search .......... None
See application file for complete search history.

(56) References Cited

U.S. PATENT DOCUMENTS

| | | | |
|---|---|---|---|
| 4,946,736 A * | 8/1990 | Sassa | 442/289 |
| 5,942,182 A * | 8/1999 | Hoge et al. | 264/510 |
| 6,228,477 B1 | 5/2001 | Klare et al. | |
| 6,843,953 B2 | 1/2005 | Filsinger et al. | |
| 2004/0059717 A1 | 3/2004 | Klare et al. | |
| 2006/0014010 A1* | 1/2006 | DeYoung et al. | 428/319.3 |
| 2007/0107220 A1 | 5/2007 | Bakhuis et al. | |
| 2009/0117367 A1* | 5/2009 | Stone et al. | 428/315.5 |
| 2009/0273111 A1 | 11/2009 | Bansal | |

* cited by examiner

*Primary Examiner* — Monica A Huson
(74) *Attorney, Agent, or Firm* — Fletcher Yoder, P.C.

(57) ABSTRACT

A method of manufacturing a fiber-reinforced article. The method includes the steps of providing a mat fiber structure defining voids therein. A membrane structure is applied over at least a portion of the fiber structure. The membrane structure includes a microporous membrane. At least the microporous membrane of the membrane structure has an oil resistance rating of at least a number 8 determined by AATCC 118 testing. A resin and hardener mix is provided. The resin is infused into voids of the fiber structure by applying a vacuum to the fiber structure and the membrane structure wherein the membrane structure inhibits the flow of resin therethrough.

14 Claims, 4 Drawing Sheets

MEMBRANE STRUCTURE FOR VACUUM ASSISTED MOLDING FIBER REINFORCED ARTICLE

BACKGROUND OF THE INVENTION

This invention relates generally to fabricating a fiber-reinforced article and particularly to fabricating the article by a vacuum assisted molding process using membrane.

Composite articles made from a fiber-reinforced resin matrix that are to be used at relatively elevated temperatures are known. By way of example, such composite articles can include jet engine blades, jet engine nacelles, boat hulls, car bodies and components, wind turbine blades, aircraft structures such as wings, wing parts, radar domes, fuselage components, nose cones, flap tracks, landing gear and rear bulkhead. The reinforcing fibers used in the composite article may be any suitable technical fiber such as fiberglass, carbon, aramid, ceramic, hybrid and the like. Depending on the service that the composite article is going to be put into, the article may be manufactured with a resin applied at an elevated temperature so the surface tension of the resin is relatively low.

The known composite articles may be fabricated by infusing resin into a fiber-reinforced layer with vacuum. Laminated sheet material is placed adjacent the fiber-reinforced layer. The laminated sheet material includes a membrane. It is known that the resin is introduced to the fiber-reinforced layer at relatively high temperatures so that the resin has a relatively low surface tension. The resin can, at times, wet or leak through the membrane. When wetting or leaking occurs the molding process is rendered less effective.

Therefore, a need exists for an improved membrane structure that can better resist wetting or leaking through the membrane for use in vacuum assisted molding operations with resins at a relatively high temperature and/or that have relatively low surface tensions.

BRIEF DESCRIPTION OF THE INVENTION

One aspect of the invention is a method of manufacturing a fiber-reinforced article. The method includes the steps of providing a mat fiber structure defining voids therein. A membrane structure is applied over at least a portion of the mat fiber structure. The membrane structure includes a microporous membrane. At least the microporous membrane of the membrane structure has an oil resistance rating of at least a number 8 determined by AATCC 118 testing. A resin and hardener mix is provided. The resin is infused into voids of the mat fiber structure by applying a vacuum to the mat fiber structure and the membrane structure wherein the membrane structure inhibits the flow of resin therethrough.

Another aspect of the invention is a method of manufacturing a fiber reinforced article. The method includes the steps of providing mat fiber structure defining voids therein. A membrane structure is applied over the mat fiber structure. The membrane structure has an oil resistance rating of at least a number 8 determined by AATCC 118 testing and an air permeability of at least 0.005 CFM per square foot at 125 Pascals as determined by ASTM D737 testing. A resin and hardener mix is provided. The resin is infused into voids of the mat fiber structure by applying a vacuum to the mat fiber structure and the membrane structure wherein the membrane structure inhibits the flow of resin therethrough.

Another aspect of the invention is a membrane structure for use in a transfer molding operation in which a resin and hardener mix is used. The membrane structure includes a microporous membrane. A porous fabric is laminated to the microporous membrane. A treatment material is applied to at least the macroporous membrane. The microporous membrane has an oil resistance of at least a number 8 determined by AATCC 118 testing and having an air permeability of at least 0.005 CFM per square foot determined by ASTM D737 testing.

BRIEF DESCRIPTION OF THE DRAWINGS

These and other features, aspects, and advantages of the invention will be better understood when the following detailed description is read with reference to the accompanying drawings, in which.

DETAILED DESCRIPTION OF THE INVENTION

A method of fabricating a composite article made with a fiber-reinforced resin matrix utilizing a new and improved oleophobic microporous membrane structure is described below in detail. The new and improved oleophobic microporous membrane structure resists, to an extent that is heretofore unknown, the leaking, "wetting" or the passage of resin with relatively low surface tensions while permitting gas to pass through it. The membrane structure permits a vacuum to be applied relatively evenly to the entire composite article or desired select portions of the composite article during a molding process. The membrane structure also enables the use of resin at operating conditions so the resin has relatively low surface tensions. The membrane structure further facilitates a controlled flow of resin and reduces defects in the article that could result from uneven resin flow. Production cycle time along with labor time is reduced along with a reduction in the cost of process consumable materials. The use of the new and improved oleophobic microporous membrane structure provides, for example, improved quality of the finished part, lower void content, reduced manual rework and optimized fiber to resin ratios.

Figure 1:
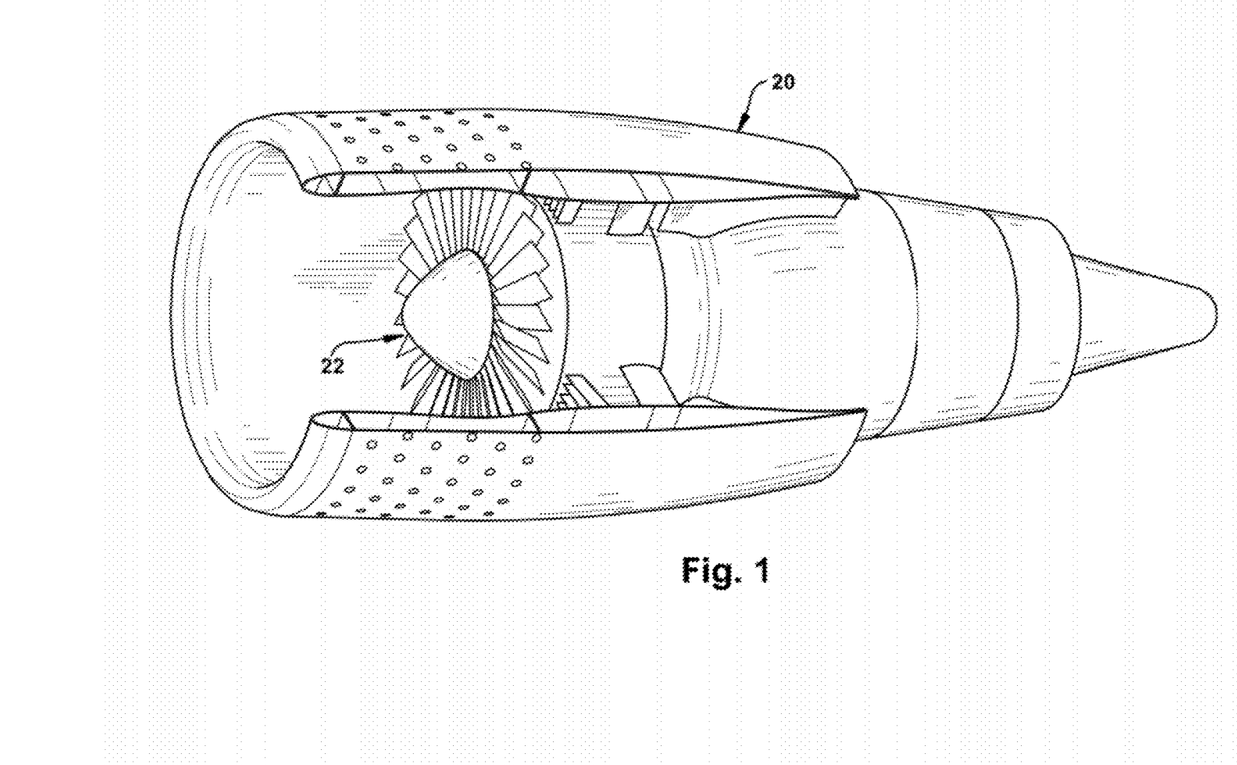
FIG. 1 is a perspective view illustrating a composite article made with fiber-reinforcement according to one aspect of the invention.

Composite articles made from a fiber-reinforced resin matrix may include, by way of a non-limiting example, an article 20, such as a carbon reinforced nacelle or housing for an aircraft jet engine 22, as illustrated in FIG. 1. The article 20 or nacelle is positioned about the jet engine 22. Because of its proximity to the jet engine 22, at least portions of the article 20 or nacelle may be exposed to elevated temperatures (for example 180° C.) for extended durations as during operation of the jet engine. While a jet engine nacelle is disclosed and described, the article 20 can include, without limitation, jet engine blades, jet engine nacelles, boat hulls, car bodies and components, wind turbine blades, aircraft structures such as wings, wing parts, radar domes, fuselage components, nose cones, flap tracks, landing gear and rear bulkhead.

The application for the article 20 may require relatively high strength over the time exposed to elevated temperatures or relatively low weight for which a technical fiber is used, such as fiberglass, carbon, aramid, ceramic, hybrid and the like or mixtures thereof. The article 20 may be manufactured with a vacuum assisted molding process when relatively high dimensional tolerance is required, low void content or high reinforcing fiber content is desired. Vacuum assisted molding processes often apply a resin, or resin and hardener mix, at a relatively elevated temperature so its surface tension is relatively low.

The article 20, according to one aspect of the invention, is made from a carbon fiber reinforced resin matrix structure. The carbon fiber reinforced structure of the article 20 can be made from one or more layers of carbon fiber reinforced material. The article 20 is fabricated by infusing resin, with or without hardener, into the carbon fiber reinforced structure with vacuum. The resin is introduced to the carbon fiber reinforcing structure at a relatively high temperature so that the resin has a relatively low surface tension.

The article 20 may be made from a pair of parts. The parts of the article 20 are made separately. The parts of the article 20 are then attached together by suitable means to form the finished article 20, as illustrated in FIG. 1.

Figure 2:
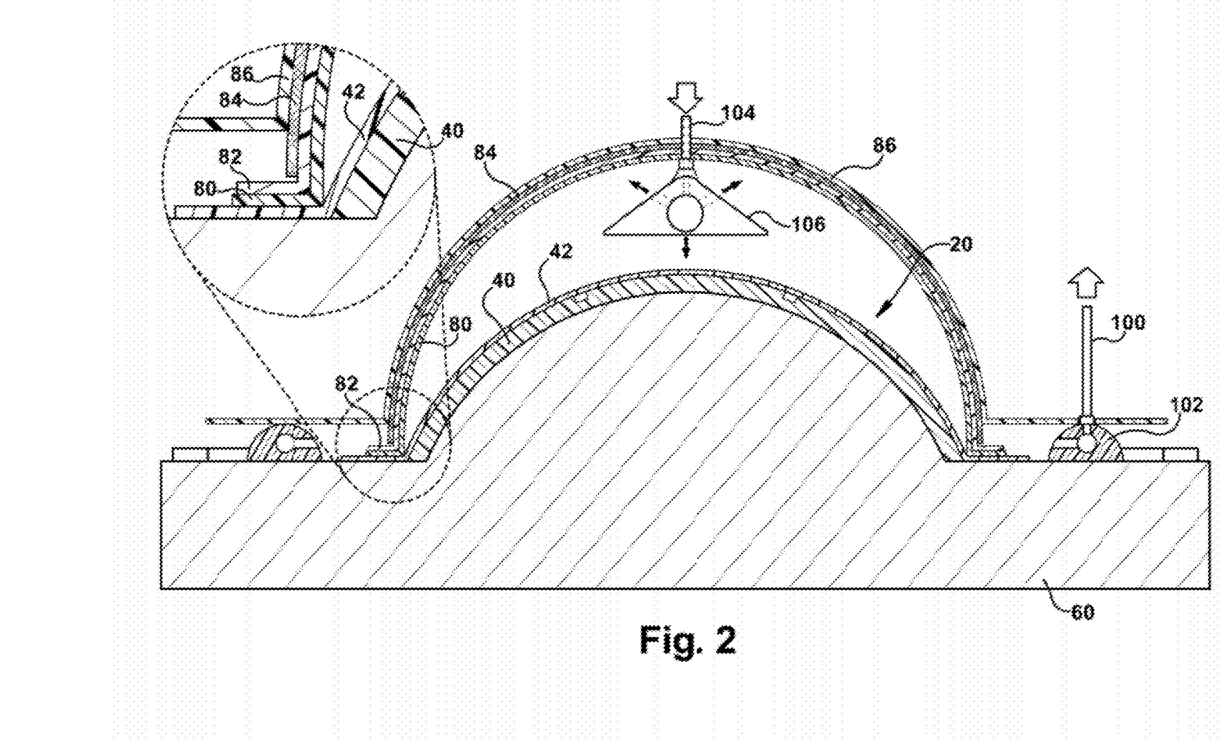
FIG. 2 is an exploded perspective view illustrating the manufacture of a portion of the composite article shown in FIG. 1, according to the one aspect.

Referring to FIG. 2, each part of the article 20 may include a core 40. The core 40 typically includes a plurality of grooves to facilitate the flow of resin through core and the remainder of the article 20 during manufacture. The core 40 may be made from any suitable material, such as polymeric foam, wood, and/or a metal honeycomb. Examples of suitable polymeric foams include, but are not limited to, PVC foams, polyolefin foams, epoxy foams, polyurethane foams, polyisocyanurate foams, and mixtures thereof.

The article 20 also includes at least one layer of structural reinforcing material 42 located adjacent the core 40. Each layer of the structural reinforcing material 42 is formed from a mat of reinforcing fibers. Typically, the mat is a woven mat of reinforcing fibers or a non-woven mat of directionally oriented reinforcing fibers. The mat of reinforcing fibers has voids throughout the structural reinforcing material 42 that are to be completely filled with resin. Examples of suitable reinforcing fibers include, but are not limited to, glass fibers, graphite fibers, carbon fibers, polymeric fibers, ceramic fibers, aramid fibers, kenaf fibers, jute fibers, flax fibers, hemp fibers, cellulosic fibers, sisal fibers, coir fibers and, hybrid fibers and the like or mixtures thereof.

During manufacture, a resin, which may also be a resin and hardener mix, is infused into the structural reinforcing material 42 of the article 20 to fill the voids in the mat of reinforcing fibers and then cured. The infused resin may be cured with heat and/or time in order to provide the article 20. The infused resin may be cured with heat and/or time in order to provide the article 20. The cured resin provides integrity and strength to each finished article 20. Examples of suitable resins include, but are not limited to, vinyl ester resins, epoxy resins, polyester resins, diglycidyl ether of bishpenol-A based resins, and mixtures thereof. The choice of a resin may depend upon the intended service of the article 20, the reinforcing fiber used and the manufacturing process.

One particularly suitable resin and hardener mix is commercially available under the tradename RTM-6 from Hexcel Corporation. The resin is a monocomponent material having a crosslinker or hardener mixed with the resin. An example of a suitable crosslinker is a blend of cycloaliphatic amines. When cured, the resin displays a three-dimensional structural network with stable properties at the relatively high temperature it may be exposed to.

Figure 7:
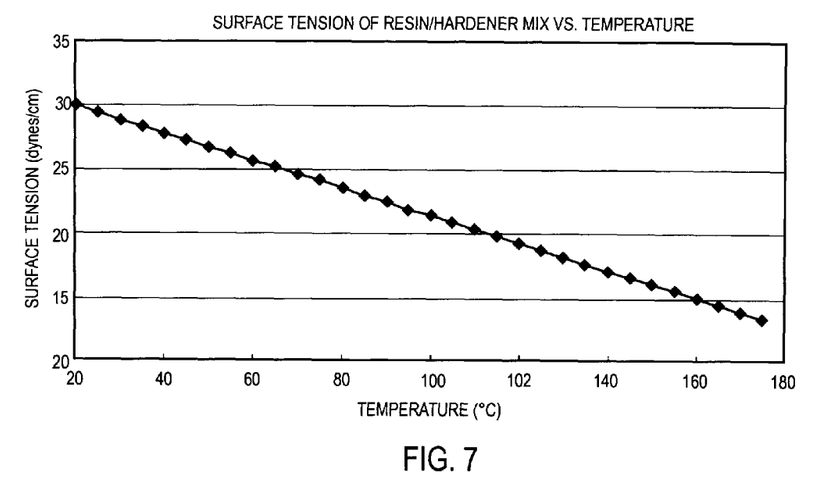
FIG. 7 is a graph illustrating the surface tension of a resin/hardener mix as a function of temperature.

The resin and hardener mix has a relatively low surface tension at the elevated temperature it is typically infused into the reinforcing fiber mat, as illustrated in FIG. 7. For example, if applied at 100° C., the surface tension of the resin and hardener mix is in the range of about 21 to 22 dynes/cm. At 80° C. the surface tension of the resin and hardener mix is in the range of about 23 to 24 dynes/cm. Approaching 180° C. the estimated surface tension of the resin and hardener mix is about 13 dynes/cm. The resin and hardener mix with this relatively low surface tension can leak through, or "wet", heretofore known membrane structures that have been used in vacuum assisted resin transfer molding processes.

During manufacture of the article 20, the structural reinforcing material 42 is arranged relative to the core 40, if any is used, and then positioned in a mold 60. A release material 80 is applied to the exposed or outer surface of the structural reinforcing material 42 of the article 20. The release material 80 is in the form of a release film and peel ply. An oleophobic and gas-permeable membrane structure or membrane assembly 82 is then applied over the release material 80 and the article 20 to facilitate the resin infusion process.

An air transport material 84 may be positioned over membrane structure or assembly 82 to further assist in degassing the work-piece by permitting gas displaced during the infusion of resin to escape the voids in the structural reinforcing material 42. Air transport material 84 can be formed from any suitable mesh or fabric material, for example, a polyethylene mesh.

A gas-impermeable vacuum bagging film or vacuum film 86 formed from a suitable material, for example, a polyamid, is positioned over air transport material 84. A vacuum connection 100 extends through a lateral edge of the vacuum bagging film 86. A seal 102 extends around the periphery of the mold 60 between the mold and vacuum bagging film 86 to prevent leakage of gas and resin. The seal 102 is in fluid connection with the vacuum connection 100.

A resin infusion input connection 104 extends through a central portion of the vacuum bagging film 86. The resin infusion connection 104 is in fluid connection with a resin supply tube 106 running essentially for the extent of the mold 60. The resin supply tube 106 is positioned adjacent the article 20.

The resin is introduced into the resin infusion connection 104, the resin supply tube 106 and structural reinforcing materials 42 while a vacuum is established through vacuum connection 100. The vacuum facilitates resin flow and infuses the resin into the voids in the structural reinforcing material 42. Membrane assembly 82 prevents the resin from flowing away from structural reinforcing materials 42 while permitting gas displaced by the infused resin to escape to the vacuum connection 100. The supply of resin and vacuum to the article 20 is stopped. The resin is then cured. Resin input connection 104 and supply tube 106, air transport material 84, vacuum bagging film 86, membrane assembly 82 and release material 80 are removed from the article 20. The article 20 can then be removed from the mold 60 and permitted to further cure, be used, finished or assembled with other components.

In one aspect of the invention, the membrane assembly 82 (FIG. 3) includes a microporous membrane 120 thermally or adhesively laminated to a porous fabric backing material 122. The membrane assembly 82 has a membrane side 124 and a fabric backing side 126.

Figure 3:
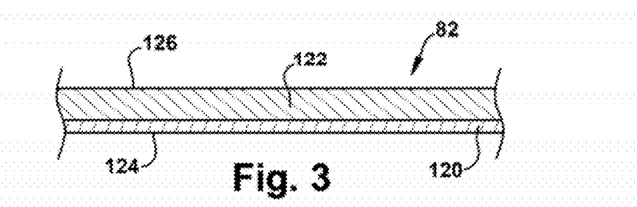
FIG. 3 is an enlarged cross-sectional view of a membrane structure illustrated in FIG. 2 used in the manufacture of at least a the portion of the composite article, according to the one aspect.

The membrane 120 is preferably a microporous polymeric membrane that allows the flow of gases, such as air or water vapor, into or through the membrane and is hydrophobic. The membrane 120 is formed from any suitable material, for example, polytetrafluoroethylene, polyolefin, polyamide, polyester, polysulfone, polyether, acrylic and methacrylic polymers, polystyrene, polyurethane, polypropylene, polyethylene, polyphenelene sulfone, and mixtures thereof. A preferred microporous polymeric membrane for use as the membrane 120 is an expanded polytetrafluoroethylene (ePTFE) that has preferably been at least partially sintered.

An ePTFE membrane typically comprises a plurality of nodes interconnected by fibrils to form a microporous lattice type of structure, as is known. The membrane 120 has an average pore size of about 0.01 micrometer ($\mu$) to about 10$\mu$. Surfaces of the nodes and fibrils define numerous interconnecting pores that extend completely through the membrane 120 between the opposite major side surfaces of the membrane in a tortuous path. Typically, the porosity (i.e., the percentage of open space in the volume of the membrane 120) of the membrane 120 is between about 50% and about 98%. The material, average pore size and surface energy of the membrane 120 help establish the oleophobicity of the membrane.

The membrane 120 is preferably made by extruding a mixture of polytetrafluoroethylene (PTFE) fine powder particles (available from DuPont under the name TEFLON® fine powder resin) and lubricant. The extrudate is then calendered. The calendered extrudate is then "expanded" or stretched in at least one direction and preferably two orthogonal directions, to form the fibrils connecting the nodes in a three-dimensional matrix or lattice type of structure. "Expanded" is intended to mean sufficiently stretched beyond the elastic limit of the material to introduce permanent set or elongation to the fibrils. The membrane 120 is preferably then heated or "sintered" to reduce and minimize residual stress in the membrane material. However, the membrane 120 may be unsintered or partially sintered as is appropriate for the contemplated use of the membrane. An example of suitable membrane 120 properties includes a unit weight of about 0.42 ounce per square yard, an air permeability of about 1.5 CFM, a Mullen Water Entry pressure of about 15 PSI and a moisture vapor transmission rate (MVTR) of about 60,000 grams per square meter per day (gr/m$^2$/day).

It is known that porous ePTFE membrane 120, while having excellent hydrophobic properties, is oleophilic. That is, the material making up the membrane 120 is susceptible to not holding out challenge agents, such as resin and hardener mix at relatively elevated temperature so it has a relatively low surface tension, such as 24 dynes/cm or lower.

Other materials and methods can be used to form a suitable membrane 120 that has an open pore structure. For example, other suitable materials that may be used to form a porous membrane include, but are not limited to, polyolefin, polyamide, polyester, polysulfone, polyether, acrylic and methacrylic polymers, polystyrene, polyurethane, polypropylene, polyethylene, cellulosic polymer and combinations thereof. Other suitable methods of making a microporous membrane 120 include foaming, skiving, casting or laying up fibers or nano-fibers of any of the suitable materials.

According to one aspect of the invention, at least the membrane 120 of the membrane assembly 82 is treated with an oleophobic fluoropolymer material in such a way that enhanced oleophobic properties result without compromising its gas permeability. According to one non-limiting aspect, the entire membrane assembly 82 is preferably treated with the oleophobic fluoropolymer material. The oleophobic fluoropolymer coating adheres to the nodes and fibrils that define the pores in the membrane 120 and the surfaces of the pores in the fabric backing material 122.

Substantially improved oleophobic properties of at least the microporous membrane 120 can be realized if the surfaces defining the pores in the membrane 120 are treated with the oleophobic fluoropolymer material. The treatment may be applied by to the membrane 120, the backing material 122 or the membrane assembly 82 any suitable means, such as those disclosed and described in U.S. Pat. No. 6,228,477 or U.S. Patent Application Publication 2004/0059717. The increased oleophobic property of the membrane 120, backing material 122 or the membrane assembly 82 is important as resins and hardener mixes that are being used that have relatively low surface tensions.

The term "oleophobic" is used to describe a material property that is resistant to wetting by liquid challenge materials, such as resin. An "oleophobic property" or "oleophobicity" of the membrane assembly 82 is typically rated on a scale of 1 to 8 according to AATCC test 118. This test objectively evaluates a test specimen's resistance to wetting by various standardized challenge liquids having different surface tensions. Eight standard challenge liquids, labeled #1 to #8, are used in the test. The #1 challenge liquid is mineral oil (surface tension: 31.5 dynes/cm at 25° C.) and the #8 challenge liquid is heptane (surface tension: 19.61 dynes/cm at 25° C.). According to the test method, five drops of each challenge liquid are placed on one side of the membrane assembly 82 to be tested. Failure occurs when leaking or wetting of the membrane assembly 82 by a selected challenge liquid occurs within 30 seconds.

The oleophobic rating number of the membrane assembly 82 corresponds to the last challenge liquid successfully tested. The higher the oleophobic number rating, the greater the oleophobic property, or oleophobicity, as evidenced by resistance to penetration by challenge liquids of relatively lower surface tension. It was found that both the membrane side 124 and the fabric side 126 of the membrane assembly 82 were able to pass a challenge by hexane that has a relatively lower surface tension than heptane. See the table below for the relation of surface tension and temperature of challenge agents.

| | | Surface tension in dynes/cm at ° C. | | | | | | | | |
|---|---|---|---|---|---|---|---|---|---|---|
| Oil repellency grade number | Challenge liquid | 20 | 25 | 40 | 50 | 60 | 70 | 80 | 90 | 100 |
| 0 | none | | | | | | | | | |
| 1 | Kaydol | 31.5 | | | | | | | | |
| 2 | 65 v % Kaydol: 35 v % n-hexadecane | 28 | | | | | | | | |

-continued

Surface tension in dynes/cm at ° C.

| Oil repellency grade number | Challenge liquid | 20 | 25 | 40 | 50 | 60 | 70 | 80 | 90 | 100 |
|---|---|---|---|---|---|---|---|---|---|---|
| 3 | n-hexadecane | 27.50 | 27.07 | 25.79 | 24.94 | 24.08 | 23.23 | 22.38 | 21.52 | 20.67 |
| 4 | n-tetradecane | 26.60 | 26.17 | 24.86 | 23.99 | 23.12 | 22.26 | 21.39 | 20.52 | 19.65 |
| 5 | n-dodecane | 25.40 | 24.96 | 23.63 | 22.75 | 21.86 | 20.98 | 20.10 | 19.21 | 18.33 |
| 6 | n-decane | 23.80 | 23.34 | 21.96 | 21.04 | 20.12 | 19.20 | 18.28 | 17.36 | 16.44 |
| 7 | n-octane | 21.60 | 21.12 | 19.70 | 18.75 | 17.80 | 16.85 | 15.89 | 14.94 | 13.99 |
| 8 | n-heptane | 20.10 | 19.61 | 18.14 | 17.16 | 16.18 | 15.20 | 14.22 | 13.24 | 12.26 |
| 8+ | n-hexane | 18.40 | 18.35 | | | | | | | |

Therefore, a new non-standard rating number of "8+" was adopted to indicate that a tested specimen resisted penetration of hexane under standard test conditions. Thus, the term "preferably at least a number 8 rating" means that a standard number 8 rating or more, such as 8+, is achieved by the tested specimen. This is a significant improvement over known membrane assemblies used in vacuum assisted molding processes.

Sample laminates in the form of membrane assemblies 82 were treated according to one aspect of the invention. The properties that resulted from the treatment are reported in the table below.

| Oil Hold Out | | |
|---|---|---|
| Membrane Side | Fabric Side | Air Perm (CFM) |
| 8+ | 8+ | 0.1 |

Some membranes 120 are relatively thin and fragile. The fabric backing material 122 is included in the membrane assembly 82 to provide support to the membrane 120. The backing material 122 may have other or alternative functions including, for example, restricting or preventing the flow of the same and/or different particles and fluids as the membrane 120 and/or protecting the membrane 120 or other layers in the membrane assembly 82 from damage from handling.

The fabric backing material 122 may be formed from non-woven or woven polymeric fibers, for example, polyester fibers, nylon fibers, polyethylene fibers and mixtures thereof. The backing material 122 is typically made from a porous woven, non-woven or scrim of polymeric material. Often the backing material 122 is made using a fibrous material, however, other porous materials may also be used. The average pore size of the backing material 122 is usually larger than the average pore size of the membrane 120, although this is not necessary in some applications. Thus, in some applications, the backing material 122 acts to at least partially filter the fluid flowing into or through the laminated article. Typically, the average pore size of the support fabric is about 500 μm (micron) or less and often at least about 0.5 μm. The porosity of the support fabric is often in the range of about 20% to almost 90%.

Suitable polymeric materials for the porous backing material 122 include, for example, stretched or sintered plastics, such as polyesters, polypropylene, polyethylene, and polyamides (e.g., nylon). These materials are often available in various weights including, for example, 0.5 oz/yd$^2$ (about 17 gr/m$^2$), 1 oz/yd$^2$ (about 34 gr/m$^2$), and 2 oz/yd$^2$ (about 68 gr/m$^2$). Woven fabric such as 70 denier nylon woven taffeta pure finish may also be used. Another suitable fabric is a non-woven textile such as a 1.8 oz/yd$^2$ co-polyester flat-bonded bi-component non-woven media.

The membrane assembly 82 is gas permeable and oleophobic. That is, the membrane assembly 82 permits the passage of gases through it. The addition of the oleophobic treatment increases the resistance of the membrane assembly 82 to being wet by resin, oil or oily substances. The membrane assembly 82 has an oil hold out or resistance rating of at least a number 8 as determined by AATCC 118 testing. The membrane assembly 82 also has an air permeability of at least 0.01 CFM/ft$^2$ at 125 Pascals per square foot of membrane measured by ASTM D737 testing.

The resulting membrane assembly 82, according to the aspect illustrated in FIG. 3, has a membrane side 124 and a fabric side 126. The membrane assembly 82 is hydrophobic on both the membrane side 124 and the fabric side 126. That is, the membrane assembly 82 prevents or resists the passage of liquids, such as water, through the laminated article. The membrane assembly 82 is gas permeable and moisture vapor transmissive. That is, the membrane assembly 82 permits the passage of gases, such as air, carbon dioxide and water vapor, through it.

An oleophobic treatment is applied to the entire membrane assembly 82 from an inorganic solvent, according to one aspect of the invention, to provide improved oleophobicity to the entire membrane assembly. The addition of the oleophobic treatment increases the resistance of the membrane assembly 82 to the passage of the resin from either the membrane side 124 or the fabric side 126. It will be apparent, however, that just the membrane 120 may be treated to increase its oleophobicity.

The backing material 122 and the membrane 120 are laminated together. The lamination of the hacking material 122 and the membrane 120 can be accomplished by a variety of methods, such as thermal lamination or adhesive lamination. FIG. 3 illustrates one aspect of a membrane assembly 82 in which the backing material 122 and membrane 120 are adhered by thermal lamination. The membrane 120 is preferably a microporous expanded polytetrafluoroethylene (ePTFE) membrane available from BHA Group, Inc. as part number QM902. The fabric backing material 122 is preferably a porous layer of spunbond material available from Freudenberg as part number Novatexx 2425. The membrane 120 and fabric backing material 122 are laminated together. The laminated membrane assembly 82 is then treated to increase oleophobic properties, according to one aspect.

It has been found that an inorganic fluid under supercritical conditions can dissolve the preferred fluorinated polymer treatment material. The resulting solution is capable of wetting the membrane assembly 82 and entering pores in the microporous membrane 120 with the dissolved fluorinated polymer treatment material. The solution with dissolved fluorinated polymer treatment material has a surface tension, viscosity and relative contact angle that permit the dissolved treatment material to be easily carried into the smallest pores of the membrane 120 and the backing material 122 with the inorganic solvent.

The inorganic solvent is preferably carbon dioxide in a supercritical phase. The surface tension of the supercritical carbon dioxide ($SCCO_2$) solution is less than 1 dyne/cm and most preferably less than 0.1 dyne/cm so it can enter very small areas of the membrane assembly 82 to be treated, such as the pores of the membrane 120. Supercritical carbon dioxide also has a viscosity of less than about 0.1 centipoise. The viscosity and surface tension of the solution are extremely low so very little resistance to flow is encountered, thus, lending itself to the possibility of entering even the smallest pores of the membrane 120. Effective treatment is possible even if the membrane assembly 82 is in a confined state, such as in a tightly wound roll of sheet material.

The fluorinated polymer treatment material, or fluoropolymer, is deposited on and around surfaces of the nodes and fibrils that define the interconnecting pores extending through the membrane 120 and pores of the backing material 122. This results in a relatively thin and even coating being applied to virtually all the surfaces of the membrane assembly 82. Once a predetermined proper amount of fluorinated polymer treatment material is deposited on the membrane assembly 82 the pores are not dramatically reduced in flow area from that of an untreated laminated article. Improved oleophobic properties are realized on both the membrane side 124 and the fabric side 126 of the membrane assembly 82.

Examples of suitable fluorinated polymer treatment materials include those having a fluoroalkyl portion or, preferably, a perfluoroalkyl portion. One such fluorinated polymer treatment material is a perfluorakyl acrylic copolymer refereed to as Fabati 100 and was designed and synthesized by Micell Technologies, Inc. Fabati 100 was synthesized in MIBK (methyl isobutyl ketone) utilizing TAN (1,1,2,2,-tetrahydroperfluorooctyl acrylate); butyl acrylate; a cross-linking agent TMI (isopropenyl-a,a-dimethylbenzyl isocyanate); Vazo 52 initiator (2,4-dimethyl-2,2'-azobispentanenitrile). The Fabati 100 treatment material is cross-linked by a post-treatment cure with heat. Another suitable perfluorakyl acrylic copolymer is Fabati 200. Fabati 200 is similar to Fabati 100 but does not have the cross-linking agent (TMI) and HBA (4-hydroxybbutyl acrylate) is used instead of butyl acrylate. Thus, the Fabati 200 treatment material does not require post-treatment heating.

A variety of inorganic solvents can be used in the solution containing the oleophobic fluorinated polymer treatment material. The term "inorganic solvent" refers to non-aqueous solvents and combinations of non-aqueous solvents, and, in particular, to solvents comprising inorganic compounds. Suitable inorganic solvents include, for example, carbon dioxide (CO2), ammonia ($NH_3$), urea [$(NH_2)_2CO$], inorganic acids, such as hydrochloric acid, sulfuric acid, carbon tetrachloride and carbon tetrafluoride and oxides of carbon such as carbon dioxide ($CO_2$), carbon monoxide (CO), potassium carbonate and sodium bicarbonate. A choice of solvent or solvents may be affected by a variety of factors including solubility of the treatment material in the solvent, molecular weight of the solvent and polarity of the solvent. In preferred aspects of the invention, the treatment material is completely dissolved in the inorganic solvent. In other aspects of the invention, the treatment material is not fully dissolved in the inorganic solvent.

The amount of fluorinated polymer treatment material in the solution may vary over a wide range. Typically, the amount of fluorinated polymer treatment material in the solution affects the resultant oleophobicity of the membrane assembly 82. Typically, the amount of fluorinated polymer treatment material, or fluoropolymer, in the solution is about 25 wt % or less and preferably, about 10 wt % or less. For many applications, that the membrane assembly 82 is used in, the amount of fluoropolymer treatment material in the inorganic solvent ranges from about 0.8 wt % to about 10.0 wt % and preferably, from about 2.0 wt % to about 5.0 wt %.

According to one aspect of the invention, the backing material 122 and membrane 120 of the membrane assembly 82 are treated together subsequent to lamination of the backing material 122 and membrane 120. Typically, during treatment, the fluorinated polymer solution wets and, preferably, saturates, the backing material 122 and membrane 120 of the membrane assembly 82. The use of an inorganic solvent facilitates the relatively uniform distribution of the fluorinated polymer treatment material throughout the backing material 122 and membrane 120 of the laminated article. The inorganic solvent is then removed. The fluorinated polymer treatment material attaches to the backing material 122 and membrane 120 and enhances the oleophobicity at both sides 124, 126 of the membrane assembly 82.

Optionally, the treated membrane assembly 82 may then be "cured" by heating. The "curing" process increases the oleophobicity by allowing rearrangement of the fluoropolymer into an oleophobic orientation. The curing temperature varies among fluoropolymers.

The membrane assembly 82 has a relatively high moisture vapor transmission rate (MVTR) and air permeability while its oleophobic properties are improved by the treatment material. Both sides 124, 126 of the membrane assembly 82 have an oil hold out rating of at least a number 8 rating as determined by AATCC 118 testing and preferably at least a number 8+ rating. The membrane assembly 82 preferably has a moisture vapor transmission rate (MVTR) of at least 1500 gr/$m^2$/day and more preferably at least 15,000 g/$m^2$/day measured by JISL-1099B2 testing. The membrane assembly 82 preferably has an air-permeability of at least 0.005 CFM per square foot of membrane, preferably at least 0.01 CFM per square foot of membrane and more preferably at least 0.05 CFM per square foot of membrane measured by ASTM D737 testing.

Improved oleophobic properties of the membrane assembly 82 are realized according to one aspect of the invention by treating surfaces defining the pores in the membrane 120 and backing material 122 as well as the surfaces of the membrane side 124 and the fabric side 126 of the membrane assembly 82 with a fluorinated polymer treatment material, or fluoropolymer. The membrane assembly 82, according to one aspect of the invention, has the treatment material coating even the smallest pores of the membrane 120 of the laminated article. The applied treatment material modifies properties of the entire membrane assembly 82, such as oleophobicity.

An alternate aspect of the invention is to use two or more membrane assemblies 82 physically overlaid together instead of being laminated together. In testing, a sample membrane structure included three membrane assemblies 82 overlaid together. The resultant membrane structure resisted leaking and wetting with the RTM-6 resin and hardener mix until the temperature of the resin and hardener mix reached 180° C. The surface tension at 180° C. for the RTM-6 resin and hardener mix is about 13 dynes/cm. In terms of AATCC 118 testing, the membrane assembly 82 has a hold out rating of at least a number 8 and even a number 8+. Air permeability of this membrane structure was 0.1 CFM at 125 Pascal per square foot of membrane measured by ASTM D737 testing.

Figure 4:
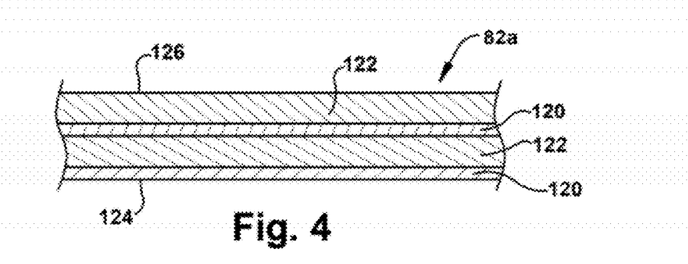
FIG. 4 is a view similar to FIG. 3 illustrating a membrane structure according to another aspect of the invention.

A membrane assembly 82a, according to another aspect of the invention illustrated in FIG. 4, includes two membrane assemblies 82 as illustrated in FIG. 3 laminated together and then subjected to the oleophobic treatment. The membrane assembly 82a has a membrane side 124 and a fabric side 126. The membrane assembly 82a is hydrophobic on both the membrane side 124 and the fabric side 126. That is, the membrane assembly 82a prevents or resists the passage of liquids, such as water, through the laminated article. The membrane assembly 82a is gas permeable and moisture vapor transmissive. That is, the membrane assembly 82a permits the passage of gases, such as air, carbon dioxide and water vapor, through it.

The membrane assembly 82a is oleophobic. The addition of the oleophobic treatment increases the resistance of the membrane assembly 82a to leakage or being wet by liquid resin, oil or oily substances. The membrane assembly 82a has an oil hold out or resistance rating of at least a number 8 as determined by AATCC 118 testing and preferably at least a number 8+ rating. The membrane assembly 82a also has an air permeability of at least 0.01 CFM/ft$^2$ at 125 Pascal as determined by ASTM D737 testing.

Figure 5:
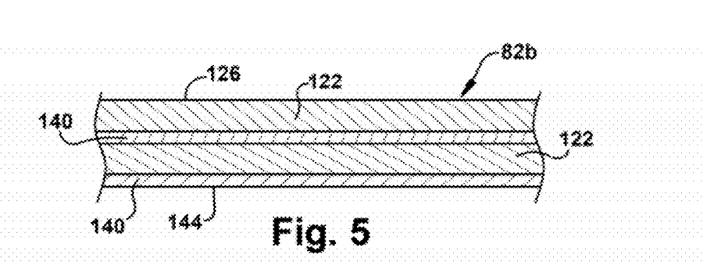
FIG. 5 is a view similar to FIG. 3 illustrating a membrane structure according to another aspect of the invention.

The membrane assembly 82b, according to another aspect illustrated in FIG. 5, includes two membrane assemblies laminated together. The membrane assembly 82b is similar to membrane assembly 82a. However, the membranes 140 used have an oleophobic treatment applied differently than the membranes 120. The membranes 140 are treated by the method disclosed in U.S. Pat. No. 6,288,477. The treated membranes 140 are then laminated to untreated fabric backing material to form the membrane assembly 82b. The membrane assembly 82b has a membrane side 144 and a fabric side 126. The membrane assembly 82b is hydrophobic on both the membrane side 144 and the fabric side 126. That is, the membrane assembly 82b prevents or resists the passage of liquids, such as water, through the laminated article. The membrane assembly 82b is gas permeable and moisture vapor transmissive. That is, the membrane assembly 82b permits the passage of gases, such as air, carbon dioxide and water vapor, through it.

The membrane assembly 82b is oleophobic. The addition of the oleophobic treatment increases the resistance of the membrane assembly 82b to being leakage or by resin, oil or oily substances. The membrane assembly 82b has an oil hold out or resistance rating of at least a number 8 as determined by AATCC 118 testing and preferably at least a number 8+ rating. The membrane assembly 82b also has an air permeability of at least 0.01 CFM/ft$^2$ at 125 Pascal per square foot of membrane measured by ASTM D737 testing.

Figure 6:
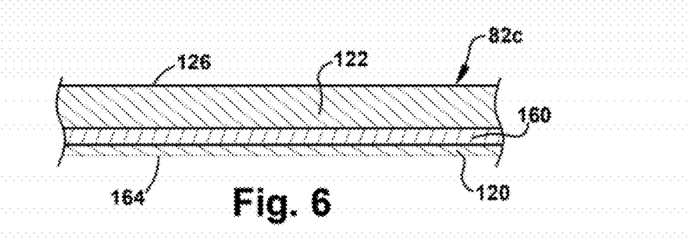
FIG. 6 is a view similar to FIG. 3 illustrating a membrane structure according to yet another aspect of the invention.

The membrane assembly 82c, according to yet another aspect illustrated in FIG. 6, includes two membranes 120 and 160 laminated to the backing material 122. The membranes 120 and 160 may be laminated together or integrally formed as one piece during manufacturing. The membranes 120, 160 may be identical or have different thicknesses, pore sizes, void spaces, or other properties. Either one, none or both of the membranes 120, 160 may be treated to enhance their oleophobic properties. The membranes 120, 160 are laminated to the fabric backing material 122. The membrane assembly 82c could be treated to increase oleophobicity after lamination. The membranes 120, 160 could be located on opposite sides of the fabric backing material 122.

The membrane assembly 82c has a membrane side 164 and a fabric side 126. The membrane assembly 82c is hydrophobic on both the membrane side 164 and the fabric side 126. That is, the membrane assembly 82c prevents or resists the passage of liquids, such as water, through the laminated article. The membrane assembly 82c is gas permeable and moisture vapor transmissive. That is, the membrane assembly 82c permits the passage of gases, such as air, carbon dioxide and water vapor, through it.

The membrane assembly 82c has enhanced oleophobic properties. The addition of the oleophobic treatment increases the resistance of the membrane assembly 82c to leakage or being wet by resin, oil or oily substances. The membrane assembly 82c has an oil hold out or resistance rating of at least a number 8 as determined by AATCC 118 testing and preferably at least a number 8+ rating so it can inhibit resin flow through the membrane assembly when the surface tension of the resin at 25 C is lower than 19.61 dynes/cm. The membrane assembly 82c also has an air permeability of at least 0.01 CFM/ft$^2$ at 125 Pascal per square foot of membrane measured by ASTM D737 testing.

An alternate aspect of the invention is to use two or more membrane assemblies 82c physically overlaid together instead of being laminated together. In testing, a sample membrane structure included three membrane assemblies 82c overlaid together. The resultant membrane structure resisted leakage and wetting with the RTM-6 resin and hardener mix until the temperature of the resin and hardener mix reached 180° C. The surface tension at 180° C. for the RTM-6 resin and hardener mix is about 13 dynes/cm. In terms of AATCC 118 testing, the membrane assembly 82 has a hold out rating of at least a number 8 and even a number 8+. Air permeability of this membrane structure was 0.1 CFM at 125 Pascal per square foot of membrane measured by ASTM D737 testing.

While the invention has been described in terms of various specific embodiments, those skilled in the art will recognize that the invention extends beyond the specifically disclosed embodiments to other alternative embodiments and/or uses of the systems, techniques and obvious modifications and equivalents of those disclosed. It is intended that the scope of the invention disclosed should not be limited by the particular disclosed embodiments described above.

What is claimed is:

1. A method of manufacturing a fiber reinforced article, the method comprising the steps of:

providing a fiber structure defining voids therein;

providing a first membrane assembly having a first fabric and having a first microporous membrane laminated to at least a portion of the first fabric such that the first membrane assembly has a membrane side and a fabric side, and the fabric side and the membrane side both have an oil resistance rating of at least a number 8 determined by AATCC 118 testing;

providing a second membrane assembly having a second fabric and having a second microporous membrane adjacent to at least a portion of the second fabric, the second microporous membrane has an oil resistance rating of at least a number 8 determined by AATCC 118 testing;

applying the first membrane assembly over at least a portion of the fiber structure; applying the second membrane assembly over at least a portion of the first membrane assembly;

providing a resin and hardener mix at a temperature up to 180° C.; and infusing the resin and hardener mix into voids of the fiber structure by applying a vacuum to the fiber structure and the first and second membrane assemblies wherein the first and second membrane assemblies inhibit the flow of resin therethrough.

2. The method of claim 1 wherein at least one of the first and second microporous membranes is made from expanded polytetrafluoroethylene.

3. The method of claim 1 wherein at least one of the first and second microporous membranes further includes an oleophobic treatment.

4. The method of claim 1 wherein the resin and hardener mix includes diglycidyl ether of bisphenol-A.

5. The method of claim 1 wherein at least one of the first and second membrane assemblies has an air permeability therethrough of at least 0.005 CFM/ft$^2$ as determined by ASTM D737 testing.

6. The method of claim 1 wherein the second membrane assembly has the second fabric layer laminated to the second microporous membrane.

7. The method of claim 1 wherein the first and second membrane assemblies resist wetting by resin and hardener mix with a surface tension as low as about 13 dynes/cm.

8. The method of claim 1 wherein at least one of the first and second membrane assemblies includes at least two microporous membranes and at least one fabric.

9. A method of manufacturing a fiber reinforced article, the method comprising the steps of:
  providing a fiber structure defining voids therein;
  providing a first membrane assembly having a first fabric and having a first microporous membrane laminated to at least a portion of the first fabric such that the first membrane assembly has a membrane side and a fabric side, and the fabric side and the membrane side both have an oil resistance rating of at least a number 8 determined by AATCC 118 testing and having an air permeability of at least 0.005 CFM per square foot determined by ASTM D737 testing;
  providing a second membrane assembly having a second fabric and having a second microporous membrane adjacent to at least a portion of the second fabric, the second microporous membrane has an oil resistance rating of at least a number 8 determined by AATCC 118 testing and has an air permeability of at least 0.005 CFM per square foot determined by ASTM D737 testing;
  applying the first membrane assembly over at least a portion of the fiber structure; applying the second membrane assembly over at least a portion of the first membrane assembly;
  providing a resin at a temperature up to 180° C.; and
  infusing the resin into voids of the fiber structure by applying a vacuum to the fiber structure and the first and second membrane assemblies wherein the first and second membrane assemblies inhibit the flow of resin therethrough.

10. The method of claim 9 wherein the first and second membrane assemblies resist wetting by resin with a surface tension as low as about 13 dynes/cm.

11. The method of claim 9 wherein at least one of the first and second microporous membranes is made from expanded polytetrafluoroethylene.

12. The method of claim 9 wherein at least one of the first and second microporous membranes further includes an oleophobic treatment.

13. The method of claim 9 wherein the resin includes diglycidyl ether of bisphenol-A.

14. The method of claim 9 wherein at least one of the first and second membrane assemblies includes at least two microporous membranes and at least one fabric.

* * * * *